United States Patent
Cassebaum et al.

(10) Patent No.: US 11,618,465 B2
(45) Date of Patent: Apr. 4, 2023

(54) METHOD FOR SPECIFYING A DRIVING STRATEGY, AND VEHICLE

(71) Applicant: Volkswagen Aktiengesellschaft, Wolfsburg (DE)

(72) Inventors: Oliver Cassebaum, Wolfsburg (DE); Enes Esatbeyoglu, Braunschweig (DE); Per Wallentin, Järna (SE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 191 days.

(21) Appl. No.: 16/889,122

(22) Filed: Jun. 1, 2020

(65) Prior Publication Data

US 2020/0385010 A1 Dec. 10, 2020

(30) Foreign Application Priority Data

Jun. 5, 2019 (DE) ............... 10 2019 208 142.8

(51) Int. Cl.
*B60W 50/08* (2020.01)
*B60W 30/165* (2020.01)
*B60W 30/182* (2020.01)

(52) U.S. Cl.
CPC ........ *B60W 50/082* (2013.01); *B60W 30/165* (2013.01); *B60W 30/182* (2013.01); *B60W 2554/4041* (2020.02); *B60W 2720/10* (2013.01)

(58) Field of Classification Search
CPC .............. H04W 4/46; B60W 60/005
See application file for complete search history.

(56) References Cited

U.S. PATENT DOCUMENTS

| | | | |
|---|---|---|---|
| 6,032,097 A * | 2/2000 | Iihoshi | G08G 1/22 340/436 |
| 9,150,221 B2 | 10/2015 | Sato et al. | |
| 9,189,961 B2 | 11/2015 | Mehr et al. | |
| 10,304,333 B2 | 5/2019 | Engel et al. | |
| 2002/0175248 A1 * | 11/2002 | Fox | B60D 1/465 246/2 R |
| 2010/0256835 A1 | 10/2010 | Mudalige | 701/2 |
| 2013/0124064 A1 * | 5/2013 | Nemoto | B60K 31/0058 701/1 |

(Continued)

FOREIGN PATENT DOCUMENTS

| | | | | |
|---|---|---|---|---|
| DE | 102007024877 A1 | 12/2008 | ............... | G05D 1/00 |
| DE | 112009005105 T5 | 9/2012 | ............ | B60W 30/16 |

(Continued)

OTHER PUBLICATIONS

German Office Action, Application No. 102019208142.8, 4 pages.
Extended European Search Report, Application No. 20174475.2, 9 pages, dated Oct. 30, 2020.

*Primary Examiner* — Jeff A Burke
*Assistant Examiner* — Jerrod Irvin Davis
(74) *Attorney, Agent, or Firm* — Slayden Grubert Beard PLLC

(57) ABSTRACT

The disclosure relates to a method for specifying a driving strategy for a vehicle driving with a first driving parameter, comprising the following steps: detecting a following vehicle that is located behind the vehicle in the driving direction of the vehicle, and detecting a second driving parameter that is assigned to the following vehicle.

19 Claims, 2 Drawing Sheets

(56) References Cited

U.S. PATENT DOCUMENTS

| | | | |
|---|---|---|---|
| 2014/0156177 A1* | 6/2014 | Caskey | G08G 1/00 |
| | | | 701/117 |
| 2017/0291608 A1 | 10/2017 | Engel et al. | |
| 2017/0344023 A1* | 11/2017 | Laubinger | B60W 30/165 |
| 2018/0082591 A1* | 3/2018 | Pandy | B60W 40/08 |
| 2018/0237012 A1* | 8/2018 | Jammoussi | H04W 4/46 |
| 2019/0096265 A1* | 3/2019 | Mok | G08G 1/163 |
| 2019/0171225 A1* | 6/2019 | Switkes | B60W 50/14 |
| 2019/0179337 A1* | 6/2019 | Ji | G08G 1/22 |
| 2019/0220037 A1* | 7/2019 | Vladimerou | G08G 1/22 |
| 2019/0385461 A1* | 12/2019 | Blomstrand | B60D 1/62 |
| 2022/0105954 A1* | 4/2022 | Li | B60W 30/165 |

FOREIGN PATENT DOCUMENTS

| | | | | |
|---|---|---|---|---|
| DE | 102012208256 A1 | | 11/2013 | B60W 30/10 |
| DE | 102012011994 A1 | | 12/2013 | B60W 30/08 |
| DE | 102012222869 A1 | | 6/2014 | B60W 30/165 |
| DE | 102013006687 A1 | | 10/2014 | B60Q 1/00 |
| DE | 102014215980 A1 | | 2/2016 | B60W 30/08 |
| DE | 102014216257 A1 | | 2/2016 | B60W 40/04 |
| DE | 112014004049 T5 | * | 8/2016 | B60W 30/16 |
| DE | 102015006445 A1 | | 11/2016 | B60W 30/14 |
| DE | 102016205141 A1 | | 5/2017 | B60W 30/08 |
| DE | 102016205972 A1 | | 11/2017 | B60W 30/08 |
| DE | 102017200871 A1 | | 7/2018 | B60W 10/04 |
| WO | 2019/013694 A1 | | 1/2019 | B60W 30/16 |

\* cited by examiner

METHOD FOR SPECIFYING A DRIVING STRATEGY, AND VEHICLE

CROSS-REFERENCE TO RELATED APPLICATIONS

This application claims priority to German Patent Application No. DE 10 2019 208 142.8, filed on Jun. 5, 2019 with the German Patent and Trademark Office. The contents of the aforesaid Patent Application are incorporated herein for all purposes.

TECHNICAL FIELD

The invention relates to a method for specifying a driving strategy for a vehicle, as well as a vehicle.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

It is known that an increasing number of driving assistance systems are integrated in vehicles that take over driving functions from the driver. In doing so, a speed for the vehicle can be selected by a driving assistance system, for example depending on the routing and/or the required range. An efficient driving style for the vehicle can thereby be achieved. However, this has the disadvantage that subsequent following vehicles may be held back when they cannot or may not pass, for example because of the current traffic situation, when a low speed is selected by the driving assistance system.

It is known from DE 10 2017 200 871 A1 to provide coupled operation between two vehicles in which several vehicles have a communication link to enable uniform driving behavior. Due to the uniform driving behavior, the flow rate of vehicles along a route section can be increased, for example. Coupled operation is, however, not possible if the following vehicle is an older vehicle that is not designed for coupled operation. It is moreover conceivable that the following vehicle will not want to engage in coupled operation at the speed of the preceding vehicle because of driver specifications, or because of independent vehicle features that enable efficient vehicle operation even at higher speeds.

SUMMARY

An object of the present invention is to at least partially overcome the above disadvantages known from the prior art.

The above object is solved by a method and a vehicle according to the independent claims. Embodiments of the invention are discussed in the dependent claims and the following description.

According to a first exemplary aspect, a method for specifying a driving strategy for a vehicle driving with a first driving parameter is provided. The method comprising the following steps: detecting a following vehicle that is located behind the vehicle in the driving direction of the vehicle, detecting a second driving parameter that is assigned to the following vehicle, recognizing a negative readiness for coupling of the following vehicle to the vehicle, and performing a reaction measure by the vehicle depending on the negative readiness for coupling and the second driving parameter.

The details of one or more embodiments are set forth in the accompanying drawings and the description below. Other features will be apparent from the description, drawings, and from the claims.

DESCRIPTION

Figure 1:
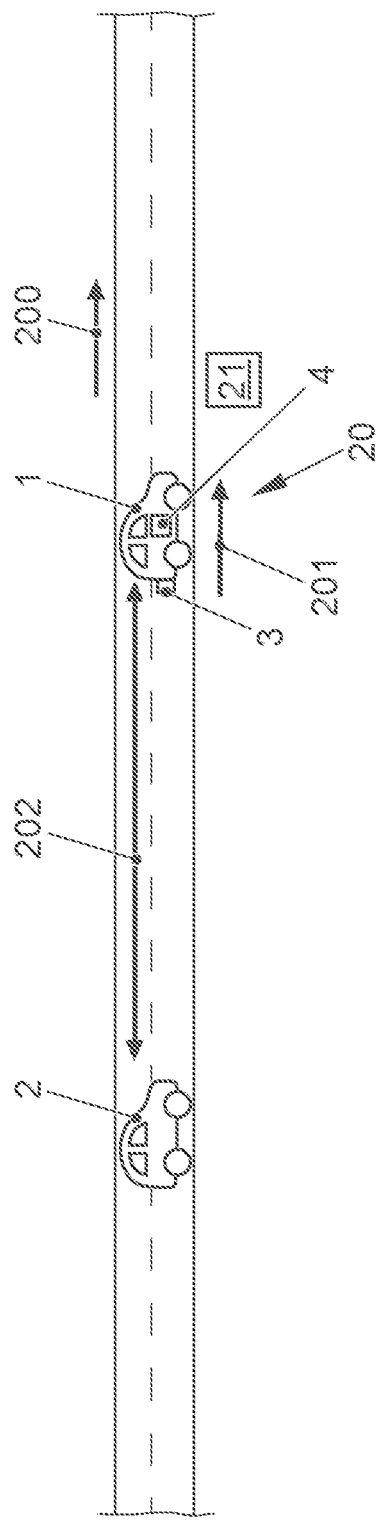
FIG. 1 shows a traffic situation of a vehicle in a first exemplary embodiment.

Specific embodiments of the invention are described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

Features and details that are described in association with the method according to the invention or its embodiments also apply to the vehicle according to the invention and its embodiments and vice versa, so that mutual reference is made, or respectively can be made, with regard to the disclosure of the individual aspects of the invention.

According to a first exemplary aspect, a method is provided for specifying a driving strategy for a vehicle driving with a first driving parameter. The method of this aspect comprises the following steps:

Detection, in particular by the vehicle, of a following vehicle that is located behind the vehicle in the driving direction of the vehicle, Detection, in particular by the vehicle, of a second driving parameter that is assigned to the following vehicle, Recognition, for example by the vehicle, of an in particular negative readiness for coupling by the following vehicle to the vehicle, and/or while retaining the first driving parameter by means of the vehicle, Performance of a reaction measure by means of the vehicle depending on the negative readiness for coupling and the second driving parameter.

In some embodiments, the dependence of the reaction measure on the readiness for coupling is understood to mean that the reaction measure only occurs when negative readiness for coupling has been recognized. For example, the reaction measure may therefore be a reaction measure to the negative readiness for coupling by the following vehicle. For example, when the negative readiness for coupling is recognized, it can be checked whether the readiness for coupling is negative or positive, wherein in the event of a positive readiness for coupling, the following vehicle is coupled to the vehicle by the following vehicle adjusting to the first driving parameter of the vehicle. In the event of negative readiness for coupling, coupling the following vehicle to the vehicle can be suspended, in particular initially. The vehicle may, e.g., also be termed the ego vehicle. For example, the steps of the method may be performed by a control unit and/or sensor unit of the vehicle. For example, the vehicle is a vehicle that can be operated at least partially in an automated manner, e.g., a vehicle that can be operated autonomously. The following vehicle may be understood to be another road user that follows the vehicle. The following vehicle may be in the same lane behind the vehicle, such as in a straight line, or, e.g., in another lane obliquely behind the vehicle. For example, the vehicle and/or the following vehicle may be a motor vehicle.

The first driving parameter may for example be a speed or an acceleration of the vehicle. In some embodiments, the vehicle can drive in an autonomous driving mode when driving with the first driving parameter. The second driving parameter may for example be a speed or an acceleration of the following vehicle. The second driving parameter may for example be a distance from the following vehicle to the vehicle. The second driving parameter can be detected by a sensor device of the vehicle. Accordingly, measurement of the second driving parameter by the vehicle may be provided. It is moreover conceivable for the second driving parameter to be detected by receiving a message about the second driving parameter from the following vehicle. Accordingly, for example, a communication link between the vehicle and the following vehicle may be established in order to exchange data. The vehicle may receive the second driving parameter via the communication link.

The readiness for coupling may for example comprise two states, wherein one of the states is the negative readiness for coupling, and the other state is the positive readiness for coupling. The readiness for coupling may for example be recognized passively or actively. It is therefore conceivable for an inquiry on the readiness for coupling by the following vehicle to be made via the communication link. The retention of the first driving parameter may be understood to mean that the vehicle maintains the first driving parameter, and/or the following vehicle adjusts to the first driving parameter, for example accepts the first driving parameter. In the event of a positive readiness for coupling, it is therefore conceivable for the following vehicle to assume a speed of the vehicle, and/or to maintain a distance from the vehicle. In some embodiments, the readiness for coupling can be actively communicated by the following vehicle to the vehicle. Accordingly, recognition can be passive by receiving the readiness for coupling from the vehicle. It is moreover conceivable for the vehicle to detect the second driving parameter by measuring. Accordingly, for example a distance measurement may be provided for detecting the second driving parameter. If the vehicle does not receive any response from the following vehicle, it may be recognized, for example using the second driving parameter, that the readiness for coupling by the following vehicle is negative, i.e., for example that the following vehicle is not prepared to be coupled, and/or the readiness for coupling does not exist. The readiness for coupling can thereby be actively detected by the vehicle.

The reaction measure may comprise an adaptation of the driving strategy of the vehicle. The vehicle may for example accelerate as a reaction measure, change its orientation in the lane, or the like. In some embodiments, an evaluation of the second driving parameter, e.g., depending on the first driving parameter, may be provided, and the reaction measure may be performed depending on the evaluation.

This may beneficially prevent the vehicle from being a hindrance for the following vehicle or, depending on the reaction measure, its hindering effect on the following vehicle is reduced. A driving strategy may therefore be specified by the reaction measure that positively affects the traffic situation.

Furthermore and in some embodiments, the first driving parameter is specified by an energy saving mode in which the vehicle is operated, wherein the reaction measure comprises a deactivation of the energy saving mode. In the energy saving mode, a vehicle speed may for example be reduced in order to reduce energy consumption. This may increase the range of the vehicle. At the same time, it may be recognized that the reduced speed causes the vehicle to be a hindrance for the following vehicle. In this case, the reaction measure may be prioritized, and the energy saving mode may be abandoned by the vehicle. In some embodiments, in deactivating the energy saving mode, the first driving parameter may be adapted at least partially to the following vehicle; for example, a vehicle speed can be increased.

In some embodiments, it is moreover conceivable for the reaction measure to comprise the initiation of an in particular virtual negotiation about coupling the following vehicle to the vehicle, such as by adapting the first driving parameter of the vehicle. Coupling may, e.g., be understood to mean a virtual link between the vehicle and the following vehicle in which the vehicle and the following vehicle maintain a constant distance and/or an adjusted speed. This may allow an efficient driving mode, such as over a short distance, and/or exploiting a slipstream of the vehicle by the following vehicle. It is therefore conceivable for a communication link to be established between the vehicle and the following vehicle in order to initiate and/or perform the negotiation. The negotiation about coupling may be understood to mean an exchange of data between the vehicle and the following vehicle. In the data exchange, it may be ascertained, in particular iteratively, which value the vehicle should assume for the first driving parameter in order for the readiness for coupling by the following vehicle to be positive. A compromise between the vehicle and following vehicle may, e.g., thereby be found, for example automatically, in which the following vehicle does not completely adapt to the vehicle, but the vehicle simultaneously does not represent a hindrance to the following vehicle. Through the negotiation, a coupling of the vehicle to the following vehicle can be enabled despite an initially negative readiness for coupling. A traffic situation and/or driving situation of the vehicle and the following vehicle may thereby be improved overall.

Moreover and in some embodiments, when the second driving parameter of the following vehicle is detected, and/or when the negative readiness for coupling is recognized, a pattern recognition of the second driving parameter is performed. The pattern recognition may, e.g., comprise an analysis of the second driving parameter. By using the recognized pattern, it may for example be assessed whether the readiness for coupling is negative or positive. Furthermore, the type of reaction measure that should be selected can be assessed using the pattern. Accordingly, for example, a distinction may be made between a critical situation from a very quickly approaching following vehicle, and a less critical situation from a slowly approaching following vehicle. Depending on the critical or less critical situation, the type of reaction measure and/or the reaction measure can be selected.

In some embodiments, the pattern recognition of the second driving parameter comprises a recognition of a change in the second driving parameter, such as an alternation of the second driving parameter. It is for example conceivable for the second driving parameter to change quickly, i.e., a recording of the second driving parameter manifests a change in time that is recognized as being critical. The reaction measure may be selected and/or performed by using the change in the second driving parameter. For example, an alternation of the second driving parameter may indicate that readiness for coupling does not exist. If the second driving parameter is a speed of the following vehicle or distance from the following vehicle to the vehicle, the reaction measure and/or the recognition of the readiness for coupling may be based on the assumption that coupling is automatic and the second driving parameter is constant when the readiness for coupling is positive. Accordingly, the readiness for coupling can be easily recognized by the vehicle from the change, and for example without feedback from the following vehicle. This may form a basis for the vehicle being able to perform a reaction measure so as to not pose a hindrance to the following vehicle.

In some embodiments, the detection of the second driving parameter is performed passively by a rear sensor system of the vehicle. Passive detection of the second driving parameter can be understood to mean that recognition occurs for example entirely by the vehicle and/or without feedback from the following vehicle. The rear sensor system may for example perform radar measurement, lidar measurement and/or optical measurement to detect readiness for coupling. It is moreover conceivable to design the rear sensor system of the vehicle to detect brightness. Accordingly, the rear sensor system may be installed in a rearview mirror of the vehicle, and/or may be used to darken a rearview mirror of the vehicle. Accordingly, several functions of the vehicle may be combined in the rear sensor system. Furthermore, an existing sensor system of the vehicle may be used to detect the second driving parameter so that additional sensors in the vehicle are unnecessary. Moreover, the second driving parameter may thereby also be easily detected for following vehicles that are not designed to communicate with other road users. A hindering effect of the vehicle may therefore also be reduced or avoided for such following vehicles.

In some embodiments, the second driving parameter of the following vehicle is detected, and/or when the negative readiness for coupling is recognized, a network is accessed by the vehicle. The network may for example be a Wi-Fi link and/or a mobile communications link, such as in the form of an LTE link. For example, a 5G network and/or a WLAN-P (Wi-Fi) link can be used for the network. In some embodiments, a cloud can be used when accessing the network. It is moreover conceivable for the network to be an ad hoc network. An ad hoc network may be a temporary communication link between the vehicle and the following vehicle. A recognition of the readiness for coupling may thereby for example be easily realized by a data exchange between the vehicle and the following vehicle. The readiness for coupling may thereby be recognized, and/or a virtual negotiation about a coupling of the vehicle and the following vehicle may occur. It is moreover conceivable for the vehicle to obtain a position of the following vehicle from the network. The position of the following vehicle may be an absolute position or a position relative to the vehicle. In some embodiments, the position data may comprise satellite-supported data such as for example GPS data. The second driving parameter may be determined from the position of the following vehicle.

In some embodiments, it is furthermore conceivable for the vehicle to be operated in an at least partially automated driving mode, for example when detecting the following vehicle, when detecting the second driving parameter, and/ or when recognizing the readiness for coupling, and for the reaction measure to comprise a deactivation of the at least partially automated driving mode. The at least partially automated driving mode may be understood to mean that driving functions of the vehicle may be performed automatically during the at least partially automated driving mode. When deactivating the at least partially automated driving mode, a switch to manual driving mode may, e.g., be provided. The control of the vehicle may therefore be handed over to a driver so that the driver may decide how he wishes to react to the following vehicle.

In some embodiments, it may be provided for the reaction measure to be performed depending on a traffic situation in which the vehicle finds itself. In some embodiments, a recognition of the traffic situation by the vehicle may be provided. It is therefore conceivable for a traffic sign to be detected by the vehicle in order to recognize the traffic situation. If the vehicle determines for example that the current traffic situation includes a ban on passing, the reaction measure may be correspondingly adapted. In some embodiments and depending on the traffic situation, it can be weighed whether or not the vehicle represents a hindrance for the following vehicle. Furthermore, the traffic situation may for example comprise a permitted maximum speed on a certain route section. If the vehicle has already reached the maximum speed, the reaction measure may comprise an indication of the, e.g., already reached maximum speed of the following vehicle. By taking into account the traffic situation, for example a reaction measure adequate to the situation may be determined.

According to another aspect, a vehicle is provided, such as a vehicle that may be operated at least partially or completely autonomously having a control unit which is designed to perform a method according to the first aspect and/or the embodiments described with respect to the first aspect.

Accordingly, a vehicle according to the present aspect offers the same benefits as described with reference to the method according to the preceding aspect. A vehicle that may be at least partially operated autonomously or at least partially driven autonomously may be understood to be a vehicle that executes driving functions without the intervention of a driver. A vehicle that may be operated completely autonomously may for example be designed to execute all of the driving functions that are in particular relevant to safety without the intervention of the driver. With an elevated degree of automation, an elevated perception of the current traffic situation and an improved reaction to the traffic situation may be necessary. Following vehicles driving behind the vehicle may also be recognized by the vehicle according to the present aspect. A road can furthermore be cleared for the following vehicles so that the vehicle does not block the following vehicle, e.g., without a human decision being necessary.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

Figure 2:
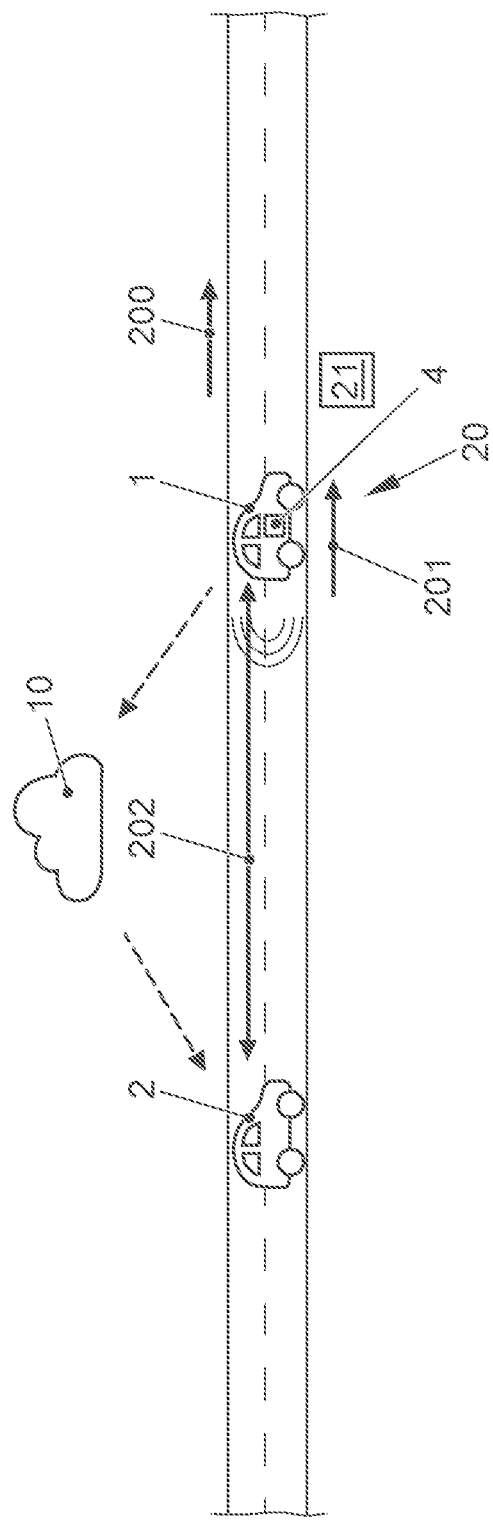
FIG. 2 shows a traffic situation of a vehicle in a second exemplary embodiment.

FIGS. 1 and 2 each show a vehicle 1 according to some embodiments in a traffic situation 20. In this case, a following vehicle 2 is located behind the vehicle 1. In particular, the following vehicle 2 and the vehicle 1 are located in the same lane. In this case, the vehicle 1 has a first driving parameter 201 with which the vehicle 1 moves in a driving direction 200. The following vehicle 2 also moves in the driving direction 200, but however has a second driving parameter 202. The first driving parameter 201 can in particular be a speed of the vehicle 1. The vehicle 1 may for example be operated in an at least partially automated, e.g., autonomous, driving mode A and/or an energy saving mode I. In particular, the vehicle 1 can be an autonomously driving vehicle 1. In this case, the vehicle 1 can move at an energy-efficient speed that lies below the maximum speed specified by the traffic situation 20, in particular by a traffic sign 21 in the traffic situation 20. If the following vehicle 2 moves at a higher speed than the vehicle 1, a hindering effect of the vehicle 1 for the following vehicle 2 can be reduced or avoided by the vehicle 1. To accomplish this, the vehicle 1 has a control unit 4 which is designed to execute a method 100.

Figure 3:
FIG. 3 shows a method in a schematic representation of the method steps.

An exemplary embodiment of method 100 for specifying a driving strategy for the vehicle 1 driving with the first vehicle driving parameter 201 is shown in FIG. 3 in a schematic representation of the method steps. The method 100 comprises a detection 101 of the following vehicle 2 and a detection 102 of the second driving parameter 202 of the following vehicle 2. The second driving parameter 202 may for example be a distance of the following vehicle 2 from the vehicle 1. It is, however, also conceivable for the driving parameter 202 to be a speed of the following vehicle. The vehicle 1 according to FIG. 1 has a rear sensor system 3 that is in a datalink with the control unit 4. By means of the rear sensor system, the vehicle 1 can passively detect the following vehicle 2 and the second driving parameter 202 of the following vehicle 2. Accordingly, the rear sensor system 3 can have a radar sensor, a lidar sensor, and/or an optical sensor for performing a measurement of the second driving parameter 202. Moreover, the rear sensor system 3 can comprise a brightness sensor and for example be integrated in a rearview mirror and/or an exterior mirror of the vehicle 1. By means of the rear sensor system 3, the second driving parameter 202 can also be detected if the following vehicle 2 is a road user that is not designed for data communication with the vehicle 1.

The vehicle 1 according to FIG. 2 has a link to a network 10 in order to detect the second driving parameter 202. To accomplish this, the control unit 4 can have a network interface. The network 10 may for example be a Wi-Fi network or a mobile communications link. In particular, it can be provided that the vehicle 1 and the following vehicle 2 form an ad hoc network as the network 10 in order to ensure a data exchange. The vehicle 1 can obtain the second driving parameter 202 directly or indirectly from the following vehicle 2 via the network 10. It can thus be provided that the following vehicle 2 directly communicates the second driving parameter 202 to the vehicle 1, or transmits data from which the vehicle 1 determines the second driving parameter 202. Furthermore, a position of the following vehicle 2 can be provided to the vehicle 1 via the network 10, by means of which the vehicle 1 can determine the second driving parameter 202.

The method 100 furthermore comprises a recognition 103 of a readiness for coupling 203 by the following vehicle 2. In doing so, the vehicle 1 checks whether the following vehicle 2 is prepared to synchronize its driving mode with that of the vehicle 1, in particular to adjust to the first driving parameter 201. In particular, the following vehicle 2 may for example assume a speed of the vehicle 1 when coupling to the vehicle 1. Given a positive readiness for coupling 203, a coupling of the following vehicle 2 to the vehicle 1 is therefore provided while retaining the first driving parameter 201 of the vehicle 1. Given a negative readiness for coupling 203, the coupling of the following vehicle 2 to the vehicle 1 does not occur, in particular wherein the following vehicle 2 is at least not prepared to be adjusted to the first driving parameter 202.

Figure 4:
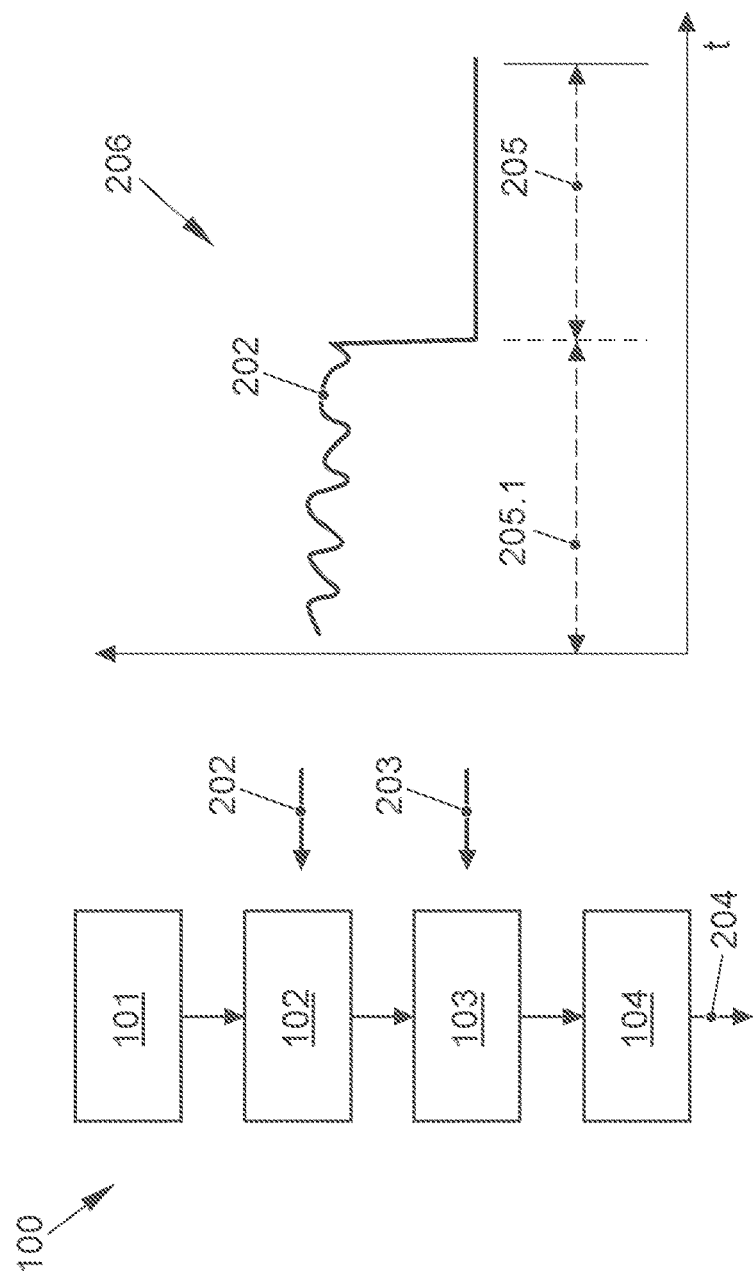
FIG. 4 shows a pattern recognition of a second driving parameter of a following vehicle.

The recognition 103 of the readiness for coupling 203 can comprise a pattern recognition 206 as shown in FIG. 4. In doing so, the second driving parameter 202 of the following vehicle 2 is detected over a time t. In particular, the second driving parameter 202 in this case is a distance from the following vehicle 2 to the vehicle 1. During an independent driving mode 205.1, the second driving parameter 202 changes by frequent alternation. During coupling 205, the second driving parameter 202 is constant over time t. Consequently, it can be assumed that the following vehicle 2 has adjusted to the vehicle 1. Pattern recognition 206 can beneficially be used in the vehicle 1 according to FIG. 1. In particular, a communication link between the vehicle 1 and the following vehicle 2 is unnecessary due to the pattern recognition 206. In addition or alternatively, the readiness for coupling 203 can also be recognized by the vehicle 1 from a data exchange between the vehicle 1 and the following vehicle 2 via the network 10 according to FIG. 2. In particular, the vehicle 1 can receive a message from the following vehicle 2 about its readiness for coupling 203.

If the readiness for coupling 203 by the following vehicle 2 was recognized as being negative, a performance 104 of a reaction measure 204 by the vehicle 1 is furthermore provided within the context of the method 100 depending on the negative readiness for coupling 203, i.e., in particular when the readiness for coupling 203 is negative, and depending on the second driving parameter 202. Given the negative readiness for coupling 203, it is therefore recognized in particular that the vehicle 1 can form a potential hindrance for the following vehicle 2. The traffic situation 20 can therefore be improved by the reaction measure 204.

Figure 5:
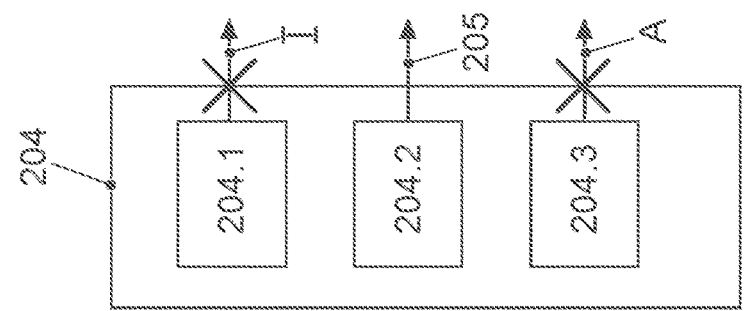
FIG. 5 shows a reaction measure with potential executions.

Possible reaction measures 204 are schematically represented in FIG. 5. In particular, the vehicle 1 can select one of the possible reaction measures 204 depending on the traffic situation 20. The traffic situation 20 may for example be taken into account in the reaction measure 204 with reference to a recognition of a traffic sign 21.

Accordingly, the reaction measure 204 can beneficially comprise a deactivation 204.1 of the energy saving mode I in which the vehicle 1 is being operated. Consequently, the energy saving mode I can be abandoned at least temporarily for the sake of the following vehicle 2, and for example a speed of the vehicle 1 can be increased.

Furthermore, the reaction measure 204 can comprise an initiation 204.2 of an in particular virtual negotiation about a coupling 205 of the following vehicle 2 to the vehicle 1. In doing so, a data exchange can occur between the vehicle 1 and the following vehicle 2 in which it is established how the vehicle 1 should adapt the first driving parameter 201 so that the following vehicle 2 will declare or assume a positive readiness for coupling 203. If the vehicle 1 is designed according to FIG. 2, the negotiation may be carried out for example via the network 10.

Furthermore, the reaction measure 204 can comprise a deactivation 204.3 of the at least partially automated driving mode A of the vehicle 1. Control of the vehicle 1 can thereby be handed over to the driver so that the driver can assess and react to the traffic situation 20.

LIST OF REFERENCE NUMERALS

1 Vehicle
2 Following vehicle
3 Rear sensor system
4 Control unit
10 Network
20 Traffic situation
21 Traffic sign
100 Method
101 Detection of 2
102 Detection of 202
103 Recognition of 203
104 Performance of 204
200 Driving direction
201 First driving parameter
202 Second driving parameter
203 Readiness for coupling
204 Reaction measure
204.1 Deactivation of I
204.2 Initiation of a negotiation
204.3 Deactivation of A
205 Coupling
205.1 Independent driving mode
206 Pattern recognition
I Energy saving mode
A At least partially automated driving mode
t Time The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for specifying a driving strategy for a vehicle driving with a first driving parameter, the vehicle being operable in an energy saving mode, the method comprising:
    operating the vehicle in an at least partly automatic driving mode;
    detecting, by the vehicle, a following vehicle that is located behind the vehicle in the driving direction of the vehicle;
    detecting, by the vehicle, a second driving parameter that is assigned to the following vehicle, the second driving parameter comprising at least one or more of a distance between the vehicle and the following vehicle, and a speed of the following vehicle;
    determining, by the vehicle, whether a negative readiness or a positive readiness for coupling of the following vehicle to the vehicle is given;
    in the event of a negative readiness, automatically performing a reaction measure by the vehicle depending on the second driving parameter, wherein the reaction measure comprises an automatic deactivation of the energy saving mode of the vehicle; and
    in the event of a positive readiness, automatically coupling the following vehicle to the vehicle by the following vehicle adjusting to the first driving parameter of the vehicle.

2. The method of claim 1, wherein the reaction measure comprises the initiation of a negotiation about a coupling of the following vehicle to the vehicle.

3. The method of claim 2, wherein the initiation of a negotiation about a coupling of the following vehicle to the vehicle is conducted by adapting the first driving parameter of the vehicle.

4. The method of claim 2, wherein during one or more of the detection of the second driving parameter of the following vehicle and the recognition of the negative readiness for coupling, a pattern recognition of the second driving parameter is performed.

5. The method of claim 2, wherein the detection of the second driving parameter is performed passively by a rear sensor system of the vehicle.

6. The method of claim 1, wherein during one or more of the detection of the second driving parameter of the following vehicle and the recognition of the negative readiness for coupling, a pattern recognition of the second driving parameter is performed.

7. The method of claim 6, wherein the pattern recognition of the second driving parameter comprises a recognition of a change in the second driving parameter, in particular an alternation of the second driving parameter.

8. The method of claim 7, wherein the detection of the second driving parameter is performed passively by a rear sensor system of the vehicle.

9. The method of claim 6, wherein the detection of the second driving parameter is performed passively by a rear sensor system of the vehicle.

10. The method of claim 1, wherein the detection of the second driving parameter is performed passively by a rear sensor system of the vehicle.

11. The method of claim 1, wherein during one or more of the detection of the second driving parameter of the following vehicle and the recognition of the negative readiness for coupling by the vehicle, a network is accessed.

12. The method of claim 1, wherein the vehicle is operated in an at least partially automated driving mode, and the reaction measure comprises a deactivation of the at least partially automated driving mode.

13. The method of claim 1, wherein the reaction measure is performed depending on a traffic situation in which the vehicle is in.

14. The method of claim 1, wherein the reaction measure comprises the initiation of a negotiation about a coupling of the following vehicle to the vehicle.

15. The method of claim 14, wherein the initiation of a negotiation about a coupling of the following vehicle to the vehicle is conducted by adapting the first driving parameter of the vehicle.

16. The method of claim 1, wherein during one or more of the detection of the second driving parameter of the following vehicle and the recognition of the negative readiness for coupling, a pattern recognition of the second driving parameter is performed.

17. The method of claim 1, wherein the detection of the second driving parameter is performed passively by a rear sensor system of the vehicle.

18. The method of claim 1, wherein during one or more of the detection of the second driving parameter of the following vehicle and the recognition of the negative readiness for coupling by the vehicle, a network is accessed.

19. A vehicle, having at least a control unit, the vehicle being operable in an energy saving mode, wherein the control unit is configured to:

operate the vehicle in an at least partly automatic driving mode;

detect a following vehicle that is located behind the vehicle in the driving direction of the vehicle;

detect a second driving parameter that is assigned to the following vehicle, the second driving parameter comprising at least one or more of a distance between the vehicle and the following vehicle, and a speed of the following vehicle;

determine, whether a negative readiness or a positive readiness for coupling of the following vehicle to the vehicle is given;

in the event of a negative readiness, automatically performing a reaction measure depending on the second driving parameter, wherein the reaction measure comprises an automatic deactivation of the energy saving mode; and in the event of a positive readiness, automatically coupling the following vehicle to the vehicle by the following vehicle adjusting to the first driving parameter of the vehicle.

* * * * *